United States Patent [19]

Tanaka et al.

[11] Patent Number: 4,682,028

[45] Date of Patent: Jul. 21, 1987

[54] METHOD OF ADJUSTING RADIATION IMAGE READ-OUT CONDITIONS

[75] Inventors: Hirosi Tanaka; Nobuyoshi Nakajima, both of Kanagawa, Japan

[73] Assignee: Fuji Photo Film Co., Ltd., Kanagawa, Japan

[21] Appl. No.: 695,332

[22] Filed: Jan. 28, 1985

[30] Foreign Application Priority Data

Jan. 26, 1984 [JP] Japan .................................. 59-12658

[51] Int. Cl.$^4$ .............................................. G03C 5/16
[52] U.S. Cl. .............................. 250/327.2; 250/484.1; 364/414
[58] Field of Search .......................... 250/484.1, 327.2; 364/414; 358/284

[56] References Cited

U.S. PATENT DOCUMENTS

| 4,091,416 | 5/1978 | Riethmuller et al. | 378/99 |
| 4,276,473 | 6/1981 | Kato et al. | 250/337 |
| 4,302,672 | 11/1981 | Kato et al. | 250/337 |
| 4,310,886 | 1/1982 | Kato et al. | 250/363 R |
| 4,496,973 | 1/1985 | Horikawa et al. | 358/209 |

Primary Examiner—Carolyn E. Fields
Assistant Examiner—Richard Hanig
Attorney, Agent, or Firm—Sughrue, Mion, Zinn, Macpeak & Seas

[57] ABSTRACT

A method of adjusting radiation image read-out conditions used in a radiation image recording and reproducing system wherein preliminary read-out and final read-out are conducted for detecting the radiation image stored in a stimulable phosphor sheet. The method comprises determining a histogram of the amount of light emitted by the stimulable phosphor sheet when it is exposed to stimulating rays during the preliminary read-out. From the histogram, the maximum light emission amount Smax and the minimum light emission amount Smin of a desired image information range are calculated. Read-out conditions are adjusted so that Smax and Smin correspond respectively to the maximum signal level Qmax and the minimum signal level Qmin of a desired input signal range in an image processing apparatus which are determined by the maximum density Dmax and the minimum density Dmin of a correct density range in a finally reproduced visible image.

6 Claims, 3 Drawing Figures

METHOD OF ADJUSTING RADIATION IMAGE READ-OUT CONDITIONS

BACKGROUND OF THE INVENTION

1. Field of the Invention

This invention relates to a method of adjusting radiation image read-out conditions used in a radiation image recording and reproducing system. This invention particularly relates to a method of adjusting the final read-out conditions by conducting preliminary read-out in a radiation image recording and reproducing system wherein preliminary read-out and final read-out are carried out.

2. Description of the Prior Art

When certain kinds of phosphors are exposed to a radiation such as X-rays, α-rays, β-rays, γ-rays, cathode-rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Patent No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

One embodiment of the aforesaid radiation image recording and reproducing system is disclosed, for example, in Japanese Unexamined Patent Publication No. 58(1983)-67240. In the embodiment, a final read-out is conducted by scanning the stimulable phosphor sheet carrying a radiation image of an object stored therein by stimulating rays which cause the stimulable phosphor sheet to emit light in proportion to the radiation energy stored, detecting the emitted light by a photoelectric read-out means and converting it into an electric image signal. However, prior to final read-out, a preliminary read-out, for approximately detecting the image information stored in the stimulable phosphor sheet, is conducted by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions. The electric image signal obtained by the final read-out is sent to an image processing means and is processed in accordance with the image recording portion and/or image recording conditions, for example, radiation energy, radiation dose, type of grid or collimator, type of stimulable phosphor sheet, to obtain a visible image suitable for viewing, particularly for diagnostic purposes. The processed image signal is used to reproduce the visible image on a photographic film or the like.

As described above, the level of the stimulating rays used in the preliminary read-out should be lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

When the image information stored in the stimulable phosphor sheet is approximately determined prior to the final read-out and the final read-out is conducted by use of the read-out conditions adjusted on the basis of the image information, it becomes possible to eliminate adverse effects of a fluctuation in the level of the radiation energy stored in the stimulable phosphor sheet, which is caused by a change in the object or the image recording portion thereof, by a fluctuation in the radiation dose, or the like, and to conduct the final read-out by use of desirable read-out conditions.

Various methods may be used for approximately determining the image information prior to the final read-out and adjusting the read-out conditions. However, a practical method will be one that enables the read-out conditions to be adjusted as simply as possible and that puts minimum limitation on the design and operation of the image reproducing apparatus. Specifically, since the density range of the visible image ultimately reproduced is determined in advance and since the level of the signal which should be supplied to the image reproducing apparatus for realizing the predetermined density range is determined in advance by gradation processing conditions or the like, the read-out conditions should be adjusted on the basis of these conditions so that the read-out apparatus generates a signal of a level equal to the level of the signal which should be supplied to the image reproducing apparatus.

SUMMARY OF THE INVENTION

The primary object of the present invention is to provide a method of adjusting radiation image read-out conditions in a simple manner in accordance with various apparatus conditions so that the limitation imposed on the image reproducing apparatus is minimized.

Another object of the present invention is to provide a method of adjusting radiation image read-out conditions, which improves the operating efficiency and reduces the cost of the whole system.

The present invention provides a method of adjusting radiation image read-out conditions used in a radiation image recording and reproducing system. A preliminary read-out prior to the final read-out is conducted by scanning a stimulable phosphor sheet carrying a radiation image of an object stored therein by stimulating rays of a level lower than the level of the stimulating rays used in the final read-out. The image information stored in the stimulable phosphor sheet is approximately detected prior to the final read-out by scanning the stimulable phosphor sheet with the stimulating rays which cause the stimulable phosphor sheet to emit light in proportion to the radiation energy stored. The emitted light is detected by a photoelectric read-out means to obtain an image signal, then read-out conditions for the final read-out are adjusted on the basis of the information obtained by the preliminary read-out, and the final read-out is conducted by use of the read-out conditions. The image signal obtained by the final read-out is sent to an image processing means, and a visible image is reproduced by use of the image signal processed by the image processing means.

The method of adjusting radiation image read-out conditions comprises the steps of:

(i) determining a histogram of the amount of the light emitted by said stimulable phosphor sheet during said preliminary read-out, (ii) from said histogram, calculating the maximum light emission amount Smax and the minimum light emission amount Smin of a desired image information range in said histogram, and (iii) adjusting said read-out conditions so that said maximum light emission amount Smax and said minimum light emission amount Smin correspond respectively to the maximum signal level Qmax and the minimum signal level Qmin of a desired input signal range in said image processing means which are determined by the maximum density Dmax and the minimum density Dmin of a correct density range in said reproduced visible image.

By the term "read-out conditions" as used herein is meant various conditions affecting the relationship between the amount of the light emitted by the stimulable phosphor sheet at the read-out step and the output of the read-out apparatus, for example, the read-out gain determining the relationship between the input and the output of the read-out apparatus, the scale factor, and the power of the stimulating rays used for read-out.

In the present invention, a histogram of the amount of the light emitted by the stimulable phosphor sheet is obtained by the preliminary read-out, and a desired image information range (range of the amount of the emitted light) is determined on the basis of the histogram. Since the pattern of the histogram is approximately fixed by the image recording portion and/or image recording conditions, the desired image information range is determined from the histogram with reference to the image recording portion and/or image recording conditions. For example, in the case of chest image recording, the pattern of the histogram becomes as shown in FIG. 1, and it is possible to know that F in the histogram designates the mediastinum, G designates the heart, H denotes the lungs, I denotes the skin and the soft tissue, and J denotes region outside of the object. Therefore, from the histogram, it is possible to calculate the maximum light emission amount Smax and the minimum light emission amount Smin defining the desired image information range. For example, when information on the skin and the soft tissue (I) and information on the region outside of the object (J) in FIG. 1 are unnecessary, the desired image information range becomes the range from Smax to Smin including F, G and H as shown. Smax and Smin may be calculated by various methods from the histogram, for example, by determining threshold values T1 and T2 in accordance with the desired image information range and calculating Smax and Smin on the basis of T1 and T2.

As described above, in the radiation image recording and reproducing system wherein the method of the present invention may be used, an electric image signal is obtained from the light emitted by the stimulable phosphor sheet by use of the read-out conditions with the final read-out means, and is subjected to various signal processings in the image processing means, particularly the gradation processing which is conducted by use of the gradation processing conditions determined in accordance with the image recording portion and/or image recording conditions. The processed signal is used to reproduce a visible image on a photographic film or the like. The reproduced visible image should have a correct density range suitable for viewing, particularly for diagnostic purposes. In general, the correct density range (Dmax to Dmin) is determined in advance. Desired gradation processing conditions are also determined in advance. Therefore, the range of signal level (Qmax to Qmin) which should be sent to the image processing means as suitable for obtaining the correct density range (Dmax to Dmin) is determined by the gradation processing conditions. FIG. 2 shows the relationship between the amount of light emitted by the stimulable phosphor sheet and the density of the reproduced visible image in the radiation image recording and reproducing system wherein the method of the present invention is used.

In the method of the present invention, the read-out conditions are adjusted so that the maximum light emission amount Smax and the minimum light emission amount Smin calculated as described above correspond to the maximum signal level Qmax and the minimum signal level Qmin determined as mentioned above.

Since the method of the present invention is constituted so that the outputs Smax and Smin of the read-out means correspond to the maximum signal level Qmax and the minimum signal level Qmin determined by the image reproducing apparatus, it is possible to conduct the image processing by the image processing means such that no limitation to nor modification of the image reproducing apparatus is required.

In order to obtain a visible image having an improved image quality, particularly a high diagnostic efficiency and accuracy, it is necessary to subject the electric image signal generated by the final read-out means to the gradation processing by use of gradation processing conditions suitable for the image recording portion and/or image recording conditions, i.e. suitable for the viewing purposes, and to process the signal so that the density of the visible image is within the correct density range. However, since the gradation processing conditions are generally nonlinear as shown in FIG. 2, the image processing by the image processing means becomes very complicated and expensive and requires a complicated image processing means or a complicated image reproducing means when the gradation processing and the signal processing for making the image density within the correct density range are conducted at the same time. On the other hand, in the method of the present invention, the range of the level of the image signal has already been adjusted in the final read-out means to correspond to the correct density range.

Therefore, in the image processing means, it is sufficient that only the gradation processing be conducted to suit the image recording portion and/or image recording conditions. As a result, it becomes possible to simplify the gradation processing means or the image reproducing means, to improve the operating efficiency of the whole system, and to reduce cost.

Also, in the present invention, since the image signal corresponding to the correct density range can be generated by the final read-out means, the signal resolution at the time of signal storing may be high. Also for this reason, it is possible to reduce the costs of the A/D converter, image processing device, memory and the like used in the system, and to improve the operating efficiency of the whole system.

Further, in the present invention, since the image information is approximately grasped by the preliminary read-out using the stimulating rays of a low level, it is possible to obtain a histogram accurately representing the image information obtained by the final read-out. Since the read-out conditions are adjusted on the basis of the accurate histogram, it is possible to obtain a visible image having an improved image quality, particularly a high diagnostic efficiency and accuracy.

DESCRIPTION OF THE PREFERRED EMBODIMENTS

The present invention will hereinbelow be described in further detail with reference to the accompanying drawings.

In the method of adjusting radiation image read-out conditions in accordance with the present invention, a histogram of the amount of light emitted by a stimulable phosphor sheet carrying a radiation image stored therein is first obtained by preliminary read-out, and the maximum light emission amount Smax and the minimum light emission amount Smin of a desired image information range are calculated from the histogram.

Figure 1:
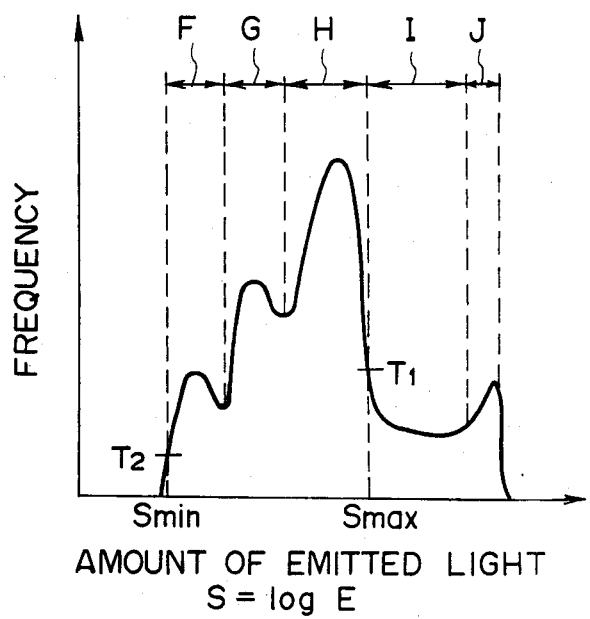
FIG. 1 is a graph showing the histogram obtained by preliminary read-out in the case of chest image recording.
Figure 3:
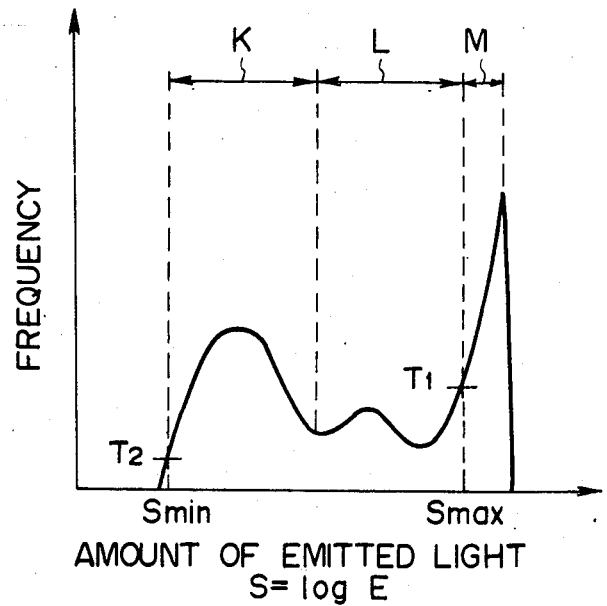
FIG. 3 is a graph showing the histogram obtained by preliminary read-out in the case of head image recording.

For example, in the case of chest image recording, a histogram as shown in FIG. 1 is obtained as described above. On the basis of the histogram, the maximum value at the lung portion H and the minimum value at the mediastinum portion F are calculated by use of threshold values T1 and T2. The maximum value and the minimum value are taken as Smax and Smin. In the case of head image recording, a histogram as shown in FIG. 3 is obtained. On the basis of the histogram, the maximum value at the skin and soft tissue portion L and the minimum value at the brain portion K are calculated by use of threshold values T1 and T2 by omitting the portion M outside of the object. The maximum value and the minimum value are taken as Smax and Smin of the desired image information range.

Figure 2:
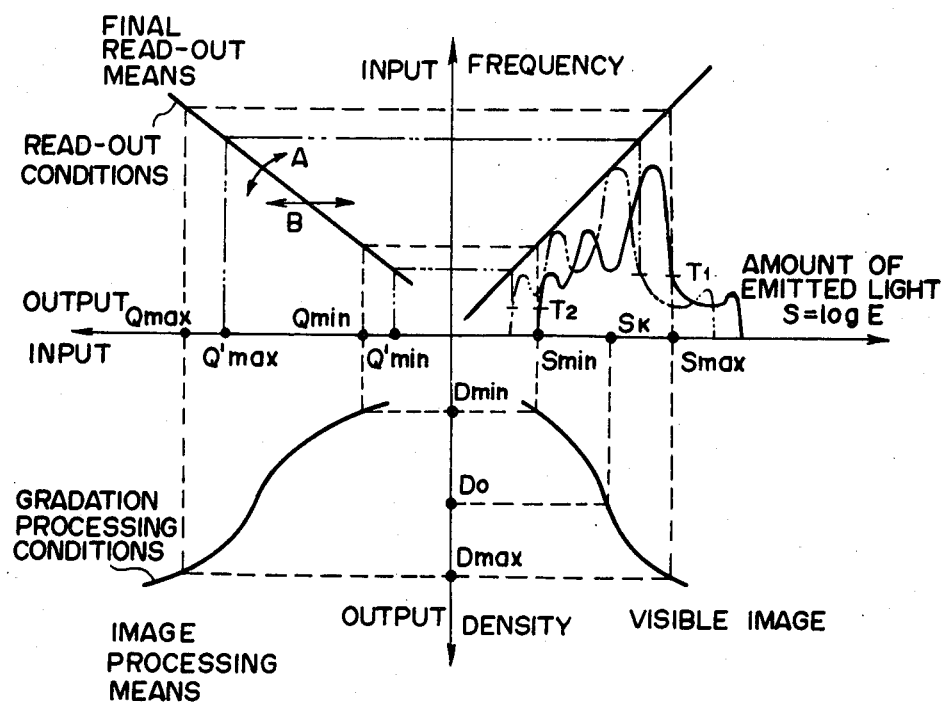
FIG. 2 is a graph showing the relationship between the histogram and the reproduced visible image in the radiation image recording and reproducing system wherein an embodiment of the method of adjusting radiation image read-out conditions in accordance with the present invention is used.

Thereafter, as shown in FIG. 2, the image read-out conditions are adjusted so that the maximum light emission amount Smax and the minimum light emission amount Smin correspond respectively to the maximum signal level Qmax and the minimum signal level Qmin of the desired input signal range in the image processing means which are determined by a desired gradation processing curve on the basis of the maximum density Dmax and the minimum density Dmin of the correct density range in the reproduced visible image.

As the maximum density Dmax and the minimum density Dmin, it is possible to use optimal values which are fixed by the image recording portion and/or image recording conditions and which are known and can be determined in advance as described above.

In FIG. 2, the read-out conditions are represented by the input-to-output conversion curve in the second quadrant. Specifically, the read-out conditions are the read-out gain in the final read-out and the scale factor. When the power of the stimulating rays is variable, the read-out conditions are changed in accordance with the power.

When the maximum density Dmax and the minimum density Dmin are determined, the maximum signal level Qmax and the minimum signal level Qmin defining the desired range of the input signals to the image processing means and corresponding to the Dmax and the Dmin are fixed on the basis of the gradation processing conditions determined in advance to suit the image recording portion and/or image recording conditions.

For example, when the soft tissue portion I is to be diagnosed in the case of the aforesaid chest image recording, it is possible to use the maximum value at the soft tissue portion I as the aforesaid Smax and to use a value suitable for the diagnosis of the soft tissue portion as the Dmax. In this case, Qmax is determined in accordance with Dmax.

The scale factor and the read-out gain as the read-out conditions are expressed by the formulae:

$$\text{Scale factor} = k1 \; \frac{Q\text{max} - Q\text{min}}{S\text{max} - S\text{min}}$$

$$\text{Read-out gain} = f(Sk)$$

Namely, the scale factor represents the inclination of the line indicating the read-out conditions in FIG. 2 (arrow A in the second quadrant in FIG. 2). By changing the scale factor in accordance with the range (Smax − Smin) of the amount of the light emitted by the stimulable phosphor sheet, it is possible to make the range of the level of the input signal to the image processing means always coincide with the range (Qmax − Qmin) of the desired input signal level. In the above-described formula, k1 is a constant for making the range of the unit amount of the emitted light coincide with the range of the unit desired input signal level.

The read-out gain represents the transverse position of the line indicating the read-out conditions in FIG. 2 (arrow B in the second quadrant in FIG. 2). By changing the read-out gain in accordance with the position of the range of the amount of the emitted light, it is possible to make the position of the range of the input signal level always coincide with the position of the range of the desired input signal level. In the above-described formula, the predetermined amount Sk of the emitted light on the histogram is used as a factor for indicating the position of the range of the amount of the emitted light. For example, when the histogram is at the position indicated by the two-dotted chain line in FIG. 2 and the image read-out is conducted by use of the read-out conditions shown in FIG. 2, the maximum input signal level and the minimum input signal level become $Q'max$ and $Q'min$, and the position of the range of the input signal level deviates to the right from the position of the range of the desired input signal level from $Qmax$ to $Qmin$. Therefore, the line representing the read-out conditions is moved to the left to make the position of the range of the input signal level coincide with the position of the range of the desired input signal level from $Qmax$ to $Qmin$.

More specifically, in the case of the chest image recording, the density of the lung portion should preferably be within the range of approximately 1.6 to approximately 1.8 in terms of the optical density, and the density of the mediastinum portion should preferably be within the range of approximately 0.2 to approximately 0.3 in terms of the optical density. Accordingly, $Dmax$ should preferably be approximately 1.8, and $Dmin$ should preferably be approximately 0.2.

In the case where the gradation processing conditions suitable for the diagnosis of the chest are adjusted as indicated by the curve in FIG. 2, the input signals to the image processing means which correspond to the output densities of 1.8 and 0.2 respectively correspond to approximately 70% and approximately 10% of the signal latitude of the image processing means. Therefore, the read-out conditions should be adjusted so that $Smax$ and $Smin$ obtained by the preliminary read-out are 70% and 10% of the signal latitude of the image processing means.

The threshold values $T1$ and $T2$ for calculating $Smax$ and $Smin$ should preferably be approximately 0.1% to 2.0% and approximately 0.05% to 1.0% of the number of picture elements. As the predetermined amount $Sk$ of the emitted light, the amount of the emitted light corresponding to the middle density $Do = 1.2$ of the system should preferably be used.

We claim:

1. A method of adjusting radiation image read-out conditions used in a radiation image recording and reproducing system wherein preliminary read-out conducted by scanning a stimulable phosphor sheet carrying a radiation image of an object stored therein by stimulating rays of a level lower than the level of the stimulating rays used in final read-out and approximately detecting the image information stored in the stimulable phosphor sheet is carried out prior to the final read-out for scanning the stimulable phosphor sheet by the stimulating rays which cause the stimulable phosphor sheet to emit light in proportion to the radiation energy stored and detecting the emitted light by a photoelectric read-out means to obtain an image signal, read-out conditions for the final read-out are adjusted on the basis of the information obtained by the preliminary read-out, the final read-out is conducted by use of the read-out conditions, the image signal obtained by the final read-out is sent to an image processing means, and a visible image is reproduced by use of the image signal processed by the image processing means, the method of adjusting radiation image read-out conditions comprises the steps of:
(i) determining a histogram of the amount of the light emitted by said stimulable phosphor sheet during said preliminary read-out,
(ii) associating range portions of said histogram with portions of said object;
(iii) selecting for the final read-out one or more portions of said object associated with contiguous range portions of said histograms, said contiguous range portions being less than the total range of said histogram and being a desired image information range;
(iv) from said histogram, calculating the maximum light emission amount $Smax$ and the minimum light emission amount $Smin$ of said contiguous range portions in said histogram, and
(v) adjusting said read-out conditions so that said maximum light emission amount $Smax$ and said minimum light emission amount $Smin$ correspond respectively to the maximum signal level $Qmax$ and the minimum signal level $Qmin$ of a desired input signal range in said image processing means which are determined by the maximum density $Dmax$ and the minimum density $Dmin$ of a correct density range in said reproduced visible image.

2. A method as defined in claim 1 wherein said maximum light emission amount $Smax$ and said minimum light emission amount $Smin$ are calculated by use of threshold values predetermined in accordance with the desired image information range.

3. A method as defined in claim 2 wherein said threshold value for calculating said maximum light emission amount $Smax$ is approximately 0.1% to 2.0% of the number of picture elements, and the threshold value for calculating said minimum light emission amount $Smin$ is approximately 0.05% to 1.0% of the number of picture elements.

4. A method as defined in claim 1 wherein said read-out conditions include a scale factor which is calculated by $$\text{scale factor} = k1 \cdot \frac{Qmax - Qmin}{Smax - Smin}$$

5. A method as defined in claim 1 wherein said read-out conditions include a read-out gain which is calculated by $f(Sk)$ where $Sk$ denotes the predetermined amount of light emitted by said stimulable phosphor sheet as plotted on said histogram.

6. A method as defined in claim 3 wherein said predetermined amount $Sk$ of the emitted light corresponds to a middle density of 1.2 in said radiation image recording and reproducing system.

* * * * *